BALANCING NETWORK FOR TELEPHONE SUBSCRIBER STATIONS

Filed July 2, 1964

INVENTORS
H.U. KNAUER
GERHARD SCHMIDT
BY
ATTORNEY

United States Patent Office 3,350,510

Patented Oct. 31, 1967

3,350,510
BALANCING NETWORK FOR TELEPHONE SUBSCRIBER STATIONS

Hans Ulrich Knauer, Kornwestheim, and Gerhard Schmidt, Stuttgart Stammheim, Germany, assignors to International Standard Electric Corporation, New York, N.Y., a corporation of Delaware Filed July 2, 1964, Ser. No. 379,937
Claims priority, application Germany, July 11, 1963, St 20,842
6 Claims. (Cl. 179—81)

ABSTRACT OF THE DISCLOSURE

A matching network for substation transmitters. The voltage drop in a voltage-dependent resistor is used to control an A.C. current path that parallels the transmitter. The noted voltage drop is a function of line current. Therefore, the transmitter sensitivity is made a function of line current.

Figure 1:
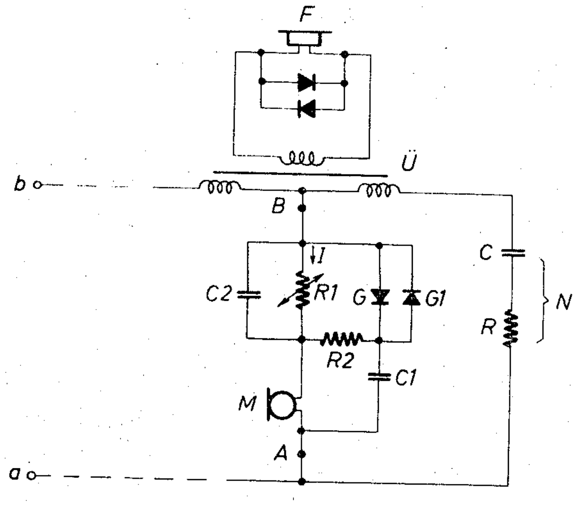

This invention relates to telephone subscriber stations and more particularly, to balancing networks for telephone subscriber stations as used to compensate for subscriber station current variations caused by line resistance changes, for example.

There are various balancing networks for telephone subscriber stations known which operate by regulating a reference equivalent in the sending and/or receiving facility as a function of the line load resistance. Very large fluctuations of the reference equivalent can occur in the sending facility, because the transmitter reference equivalent also depends on the microphone supply current. Subscriber station circuits known therefore, provide instead of the carbon-type microphone, a speech amplifier driven moving coil microphone. Therefore, the different attenuations of the various subscriber lines must be adjusted for use in the transmitting direction only. Such a station circuitry, however, is very expensive.

It is also known to regulate the transmitter reference equivalent in subscriber stations that use carbon-type microphone. A non-linear resistor is inserted into the power supply circuit. Such a device balances only the portion of the fluctuations of the transmitter reference equivalent that is caused by the fluctuating supply current. Therefore, a similar balancing circuit is frequently provided for the receiving direction or the balancing effect of the non-linear resistor is increased through the use of active elements. Since these balancing circuits show separate control and supply inputs a considerable number of elements is necessary for a satisfactory balancing of the reference equivalent.

An object of the invention is to provide balancing networks for telephone subscriber stations which can balance the transmitter reference equivalent without the aid of active switching circuits so that the receiving device needs no balancing in most cases.

Another object of the invention is to provide balancing networks comprising inexpensive components. The expenditure in elements shall remain reasonable and the characteristics of the non-linear resistors used shall be normal despite the wide balancing range.

According to the invention the balancing network for telephone subscriber stations is characterized in this that the transmitter reference equivalent of the microphone is balanced by a preceding non-linear resistor, and that the voltage drop, depending on line resistance, occurring in this balancing circuit is used to control a non-linear A.C. circuit connected in parallel to said microphone circuit. By regulating the D.C. supply current in the microphone circuit and by the additional attenuation of the A.C. part of said microphone circuit a very wide control or regulating range is obtained. The range is increased even more if the control voltage for the A.C. circuit is pre-adjusted. The invention provides a cold conductor as non-linear resistor in the microphone circuit.

The voltage drop across said series-connected resistor is used to control the resistance of a crystal diode in the parallel-connected A.C. circuit. The control effect can be determined by the coupling resistor. Another construction of the balancing network according to the invention, provides as A.C. circuit a voltage-dependent resistor, e.g., a varistor, which is fed and controlled by the voltage drop across the non-linear series resistor and/or at the microphone.

Figure 2A:
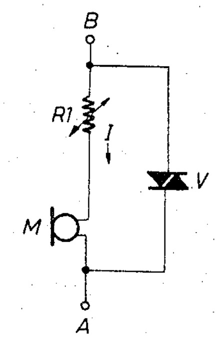
Figure 2B:
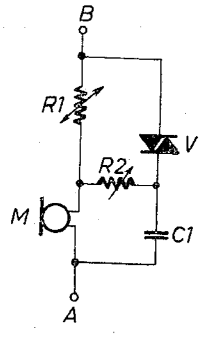

The invention is now explained in detail with the aid of the accompanying drawing, wherein:

FIG. 1 shows the transmitter and receiver circuit of the telephone subscriber station with a balancing network according to the invention in the transmitter circuit; and FIG. 2 shows a simplified balancing network according to the invention.

FIG. 1 only shows the transmitter and receiver circuit of the telephone subscriber station. The components required for ringing and dialling are not shown because they are without interest for understanding the invention. The terminating line is connected to the terminals *a*, *b* of the station. The station's circuits are essentially marked by the cradle switch with the transformer U and the balancing network N. The receiving circuit with the receiver F is connected inductively. No regulation or control for the reference equivalent is provided in the receiving circuit, except for a cracking noise protection rectifier to limit the amplitude. The supply current furnished by the exchange flows through a winding of the cradle transformer U to the transmitter circuit connected in the zero-branch of the bridge circuit. A non-linear resistor R1 is series connected to the microphone M. The characteristic curve of said resistor is selected thus that the resistance increases when the current I rises. This is particularly the case with the so-called cold conductors. In this manner, the microphone current and, consequently, the transmitter reference equivalent of the microphone M is controlled as a function of the line resistance. Such a control is known per se; but, in most cases it is sufficient, because the attenuation of the line assumes also different values. The invention therefore provides that by the use of the cold conductor control element or circuit, an A.C. circuit switched in parallel to the transmitter circuit is controlled.

As may be gathered from FIG. 1 the voltage drop at the adjustable resistor R1 supplies a crystal diode G via a coupling resistor R2, which diode is series-connected with a capacitor C1. When a high current flows on the line a large voltage drop at the adjustable resistor R1 occurs. The current across the coupling resistor R2 and the crystal diode G increases. The resistance of the crystal diode is decreased and, consequently, the transmitter circuit M, R1 is more heavily attenuated via the A.C. circuit G, C1. Since the control voltage of the A.C. circuit is already controlled, a very good balancing and control effect is obtained.

As is indicated by the crystal diode G1, parallel connected to the crystal diode G but in opposite sense, the A.C. circuit can be made independent of the line polarity. The magnitude of the coupling resistor R2 determines the Q point of the crystal diode. It is of advantage to make the coupling resistor adjustable or controllable. The capacitor C2 connected in parallel to the adjustable resistor R1 can be used to reduce the basic attenuation caused by the resistor R1.

FIG. 2 shows another extremely simplified balancing network for telephone subscriber stations. The voltage drop at the control element R1 and microphone M is used to control a voltage dependent resistor, e.g., a varistor V. Here too, the D.C. Q point and the attenuation of the transmitter circuit can be adjusted separately by a preceding resistor capacitor combination.

When a high value of current flows on the line, the voltage drop across R1 is relatively large. This large voltage controls the voltage dependent element such as varistor V to allow more current to flow around the microphone thus attenuating the signals to the microphone.

While the principles of the invention have been described above in connection with specific apparatus and applications, it is to be understood that this description is made only by way of example and not as a limitation on the scope of the invention.

What is claimed is:

1. A balancing network for transmitter sections of telephone subscriber stations comprising first non-linear resistance means in series with the transmitter, said first non-linear resistance means having characteristics whereby its resistance increases proportionately with the current flow therethrough, non-linear A.C. circuit means bridging said transmitter and said first non-linear resistance, said A.C. circuit means consisting of a series connected semiconductor diode and a first capacitor, and control means for controlling said non-linear A.C. circuit means responsive to the current flow through said first non-linear resistance means, said control means comprising a coupling resistor for coupling the junction point of said first non-linear resistance and said transmitter to the coupling point of said semi-conductor diode means and said first capacitor.

2. In the balancing network of claim 1 wherein said diode means comprises two crystal diodes which are connected in parallel but with opposite sense.

3. In the balancing network of claim 1 wherein said coupling resistor is adjustable.

4. A balancing network according to claim 1 characterized in this that the first non-linear resistance means is bridged by a second capacitor.

5. In the balancing network of claim 1 wherein said non-linear A.C. circuit means comprises a varistor, said varistor being parallel-connected to the series connection of said first non-linear resistance and said transmitter.

6. In the balancing network of claim 1 wherein said non-linear A.C. circuit means comprises a varistor in series with a first capacitor.

References Cited

UNITED STATES PATENTS

| | | | |
|---|---|---|---|
| 2,770,679 | 11/1956 | Beadle | 179—81 |
| 2,775,649 | 12/1956 | Pacock | 179—81 |

FOREIGN PATENTS

| | | |
|---|---|---|
| 232,543 | 2/1959 | Australia. |

KATHLEEN H. CLAFFY, *Primary Examiner.*

H. ZELLER, *Assistant Examiner.*